(12) United States Patent  
Nachenberg (10) Patent No.: US 7,774,313 B1
(45) Date of Patent: Aug. 10, 2010

(54) POLICY ENFORCEMENT IN CONTINUOUS DATA PROTECTION BACKUP SYSTEMS

(75) Inventor: Carey Nachenberg, Manhattan Beach, CA (US)

(73) Assignee: Symantec Corporation, Mountain View, CA (US)

( * ) Notice: Subject to any disclaimer, the term of this patent is extended or adjusted under 35 U.S.C. 154(b) by 291 days.

(21) Appl. No.: 11/289,148

(22) Filed: Nov. 29, 2005

(51) Int. Cl.
*G06F 7/00* (2006.01)

(52) U.S. Cl. ........................ 707/640; 707/694
(58) Field of Classification Search ............... None
See application file for complete search history.

(56) References Cited

U.S. PATENT DOCUMENTS

| | | | |
|---|---|---|---|
| 5,047,918 A | | 9/1991 | Schwartz et al. |
| 5,572,709 A | * | 11/1996 | Fowler et al. ............... 707/200 |
| 6,941,322 B2 | * | 9/2005 | Bills et al. ................... 700/200 |
| 7,225,208 B2 | | 5/2007 | Midgley et al. |
| 7,260,564 B1 | | 8/2007 | Lynn et al. |
| 2002/0174139 A1 | * | 11/2002 | Midgley et al. ............. 707/204 |
| 2003/0061456 A1 | * | 3/2003 | Ofek et al. .................. 709/203 |
| 2003/0229650 A1 | * | 12/2003 | Olstad et al. ................ 707/200 |
| 2005/0193031 A1 | | 9/2005 | Midgley et al. |
| 2005/0210041 A1 | * | 9/2005 | Taguchi ...................... 707/100 |
| 2005/0235016 A1 | * | 10/2005 | Amano et al. ............... 707/204 |
| 2007/0022117 A1 | * | 1/2007 | Keohane et al. ............. 707/8 |

OTHER PUBLICATIONS

Non-Final Office Action received in U.S. Appl. No. 11/288,587; Apr. 17, 2008.
Final Office Action received in U.S. Appl. No. 11/288,587; Aug. 21, 2008.
Non-Final Office Action received in U.S. Appl. No. 11/288,587; Nov. 24, 2008.
Final Office Action received in U.S. Appl. No. 11/288,587; Apr. 13, 2009.

* cited by examiner

*Primary Examiner*—Tim T. Vo
*Assistant Examiner*—Jau-Shya Meng
(74) *Attorney, Agent, or Firm*—Advantedge Law Group (57) ABSTRACT

Policy-based performance of continuous data protection on protected data. A write request targeted to a portion of the protected data is detected. In addition, a journaling policy data structure(s) is accessed. The journaling policy data structure represents policy for how frequently to journal write request to a backup medium and/or what backup medium to journal write requests to depending on one or more characteristics of write request targets. The journaling policy data structure is then used to determine whether the write request should be presently journaled and/or to identify the backup medium that the write request should be journaled to based on the one or more characteristics of the portion of the protected data targeted by the write request. The journaling policy may, but need not, be selected so as to preserve storage and/or network bandwidth associated with the journaling process.

19 Claims, 8 Drawing Sheets

POLICY ENFORCEMENT IN CONTINUOUS DATA PROTECTION BACKUP SYSTEMS

BACKGROUND OF THE INVENTION

Businesses, residences, and other enterprises have come to rely on computing systems to access, generate and manage their key files, documents, and other operational data. Often, the data itself is many times more valuable to an enterprise than the computing hardware that stores the data. Accordingly, in this information age, many enterprises have taken precautions to protect their data.

One way of protecting data is to introduce storage redundancy. For example, a primary computing system maintains and operates upon the active data. Meanwhile, a backup computing system maintains a copy of the data. This may be accomplished by periodically taking a snapshot of the active data as that active data existed at the time of the snapshot, and by providing the snapshot copy of the protected data to a backup location on a periodic basis. For instances, snapshot-based backups often are configured to occur on a daily basis, though more or less frequent backup periods are also common. Should the active data be lost, the most recent backup copy of the data may be restored, thereby recovering the active data as the active data existed at the time of the last backup.

In some instances, however, it may be highly undesirable to lose all of the changes to the data that occurred since the time of the last snapshot backup. In such cases, Continuous Data Protection CDP may be more desirable. In CDP-based backup systems, an initial copy of the live data to be protected is captured and transferred to a backup medium. All subsequent writes to the live data are then time-stamped and journaled to the backup medium after each write operation. For instance, whenever a write operation occurs, the time, content, and target location of the write operation are documented in a data structure, which is then provided to the backup medium.

Since CDP-based backup systems back up and time stamp each block written to the protected data, it is possible to recover any state of the protected data since the time of the initial backup, in contrast to traditional snapshot-based backup systems which can recover only those states of the protected data that happen to exist at the time of the prior snapshot-based backup. This allows for a recovery back to any point in time to recover any version of a file.

Conventionally, CDP-based backup systems journal every block of every file modified on a volume, consuming large amounts of storage and requiring significant network bandwidth to replicate the journaled data to remote backup systems.

BRIEF SUMMARY OF THE INVENTION

The foregoing problems with the prior state of the art are overcome by the principles of the present invention, which are directed towards policy-based performance of continuous data protection on protected data. A write request targeted to a portion of the protected data is detected. In addition, a journal policy is accessed. The journal policy represents policy for how frequently to journal write requests to a backup medium and/or what backup medium to journal write requests to depending on one or more characteristics of write request targets. The journaling policy data structure is then used to determine whether the write request should be presently journaled and/or to identify the backup medium that the write request should be journaled to based on the characteristics of the portion of the protected data targeted by the write request. The journaling policy may, but need not, be configured so as to preserve storage and/or network backwidth associated with the journaling process.

Additional embodiments the invention will be set forth in the description that follows, and in part will be obvious from the description, or may be learned by the practice of the invention. The embodiments of the invention may be realized and obtained by means of the instruments and combinations particularly pointed out in the appended claims. These and other embodiments of the present invention will become more fully apparent from the following description and appended claims, or may be learned by the practice of the invention as set forth hereinafter.

BRIEF DESCRIPTION OF THE SEVERAL VIEWS OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The principles of the present invention relate to policy-based performance of continuous data protection on protected data. First, a general computing system will be described with respect to FIG. 1, as being a suitable computing system that may be used to practice the principles of the present invention. Then, the principles of the present invention will be described with respect to FIG. 2 and subsequent figures.

Figure 1:
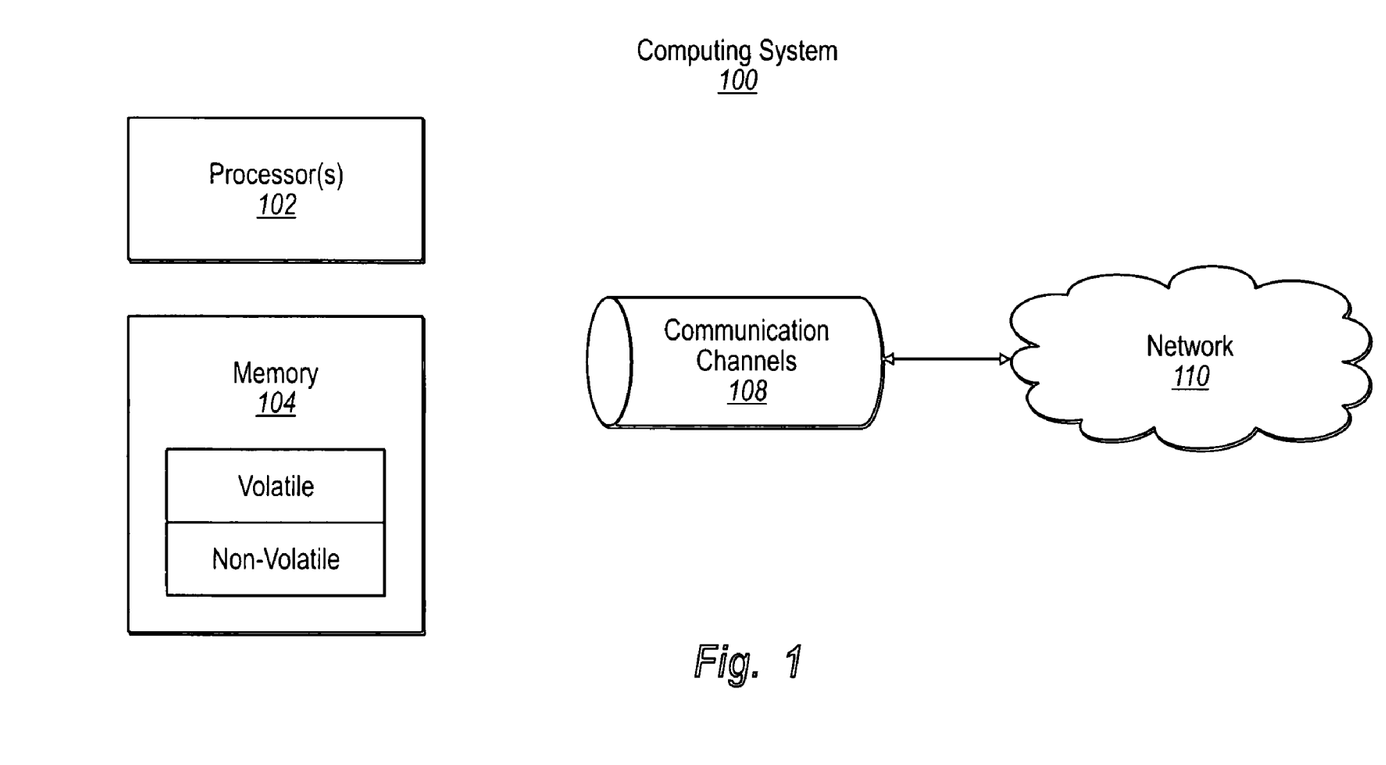
FIG. 1 illustrates a computing system that may be used to implement features of the present invention.

FIG. 1 shows a schematic diagram of an example computing system 100 that may be used to implement features of the present invention. The described computing system is only one example of such a suitable computing system and is not intended to suggest any limitation as to the scope of use or functionality of the invention. Neither should the invention be interpreted as having any dependency or requirement relating to any one or combination of components illustrated in FIG. 1.

Computing systems are now increasingly taking a wide variety of forms. Computing systems may, for example, be handheld devices, appliances, laptop computers, desktop computers, mainframes, or distributed computing systems. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems.

Referring to FIG. 1, in its most basic configuration, a computing system 100 typically includes at least one processing unit 102 and memory 104. The memory 104 may be volatile, non-volatile, or some combination of the two. An example of volatile memory includes Random Access Memory (RAM). Examples of non-volatile memory include Read Only Memory (ROM), flash memory, or the like. The term "memory" may also be used herein to refer to non-volatile mass storage. Such storage may be removable or non-removable, and may include (but is not limited to) PCM-CIA cards, magnetic and optical disks, magnetic tape, and the like.

As used herein, the term "module" or "component" can refer to software objects or routines that execute on the computing system. The different components, modules, engines, and services described herein may be implemented as objects or processes that execute on the computing system (e.g., as separate threads). While the system and methods described herein may be implemented in software, implementations in hardware, and in combinations of software and hardware are also possible and contemplated.

In the description that follows, embodiments of the invention are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100.

The phrase "computer-readable storage medium," as referred to herein, generally refers to any form of storage device or medium capable of storing computer-readable instructions. Examples of computer-readable storage media include—without limitation—physical media, such as magnetic-storage media (e.g., hard disk drives and floppy disks), optical-storage media (e.g., CD- or DVD-ROMs), electronic-storage media (e.g., solid-state drives and flash media), and the like.

The phrase "computer-readable storage medium," as referred to herein, generally refers to any form of physical storage device or medium capable of storing computer-readable instructions. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like.

Figure 2:
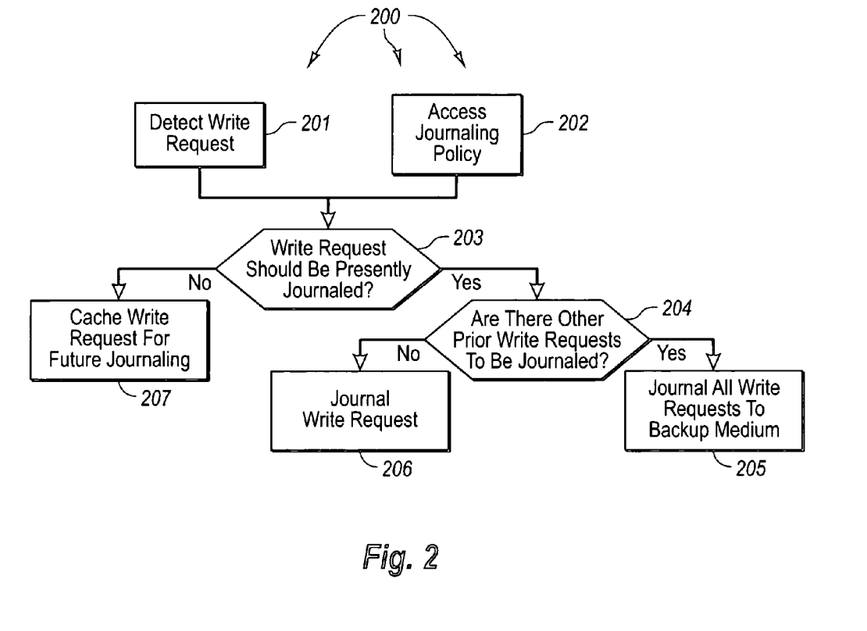
FIG. 2 illustrates a flowchart of a method for performing continuous data protection in which the journaling frequency is determined based on journaling policy.

As previously mentioned, however, journaling of each write request can take significant storage and/or bandwidth. The method 200, however, reduces the storage and/or bandwidth requirements associated with performing continuous data protection by not necessarily journaling every write request, and/or by perhaps clustering groups of two or more write requests together before each journaling operation to the backup medium. The journaling decision may be made for each write request in response to a journal policy.

The method 200 may be performed by the computing system 100 of FIG. 1, although not required, and may be initiated whenever a write request to the protected data is received or otherwise detected (act 201). The write request typically includes a designator that identifies the request as a write request, a target identifier identifying the target portion of the protected data to be written to, and replacement content that contains the data to be written to the identified write target. The write request may be at the file or directory level (hereinafter collectively referred to as being at the "file level" or "file system level"), in which case the target of the write request is a logical file or directory block. On the other hand, the write request may be below the file level (e.g., at the sector or cluster level in disk-based storage), in which case the target of the write request may be a particular sub-file block (such as a sector or cluster). In this description and in the claims, a "sub-file block" may be one or more sectors or one or more clusters. The target of the write request may also be an object or an individual object field or collection of object fields as used in object-oriented programming.

At any time before, during and/or after the write request is received (act 201), a journaling policy data structure is accessed (act 202). In this description and in the claims, a computing system "accessing" a data structure means that all or perhaps even just a portion of the data structure is read to the extent that the computing system may then act upon the portion of the data structure read. The journaling policy data structure represents journaling policy for how frequently to journal write requests to a backup medium depending on one or more characteristics of write request targets. For example, if the target of the write request is a particular file, or portion of a file, the journal policy may specify a frequency for journaling based on a file type of the file.

For instance, an enterprise could configure the journaling policy such that file types that are more critical to the operation of the enterprise might be journaled more frequently or aggressively (e.g., 100% of the time) than are file types that are less critical to an organization. For instance, documents with a ".doc" extension type indicating a MICROSOFT Word document may be journaled whenever a write request is received, while MP3 audio files are journaled less frequently (perhaps 33% of the time). The journaling policy could also specify that journaling is to occur depending on certain content of the file, directory, or object being written to. For example, if the file being written to contains the words "urgent" or "confidential", journaling may be done for each write request to the file, whereas if the file does not contain those words, perhaps journaling is only done half the time. Thus, content parameters of the target may be target characteristics that dictate how frequently to journal, whether the target be a directory, a file, an object, or a sub-file block. Other examples of content parameters include the number of times that a certain word appears in a target file. For instance, if the target document contains more than a certain number of instances of the word "discovery", or if perhaps the word discovery appears more times than there are pages in the document, journaling might occur more frequently since the file might more likely be the object of discovery. A content parameter might also include the author or creator of a file. Those who are more likely to need more fine-grained recovery may have their associated files journaled more frequently.

Once the journaling policy is accessed (act 202), it is then determined whether the write request should be presently journaled using the journaling policy and based on one or more characteristics of the target portion of the protected data targeted by the write request (decision block 203). There is an infinite variety of different algorithms that could be employed using the principles of the present invention to make a decision on whether or not to presently journal a write request. One example is now given for illustrative purposes only.

Suppose, for example, a first write request is received, and the journaling policy assigns a journal frequency of 33% of the first write request since its target is an MP3 file. This amount is added to a sum corresponding to that file that is initially zero, leaving the file-specific sum at 33% after the addition. If the sum after the addition is less than 100%, then the write request is not journaled if the write request is at the file-level, or if the write request is at the sub-file block level (e.g., at the sector or cluster level) the write request is stored in a cache to thereby postpone the journaling of that write request. If the sum after the addition reaches or exceeds 100%, the current write request is journaled.

Network bandwidth and storage is preserved whether the write request is at the file system level or at the sub-file block level. For instance, if the write request tracking is performed at the file level, then not every file write request will always be cached. Only the most current file write request will be journaled when there is an automated decision to journal based on the journaling policy. Furthermore if the write request tracking is performed at the sub-file block level (e.g., at the sector or cluster level), the write request may be journaled in a single journaling data structure along with all other previously-postponed and cached write requests to sub-file blocks corresponding to the same file. However, if this collection of sub-file write request includes writes to the same sub-file block, only the latest write request to that sub-file block is journaled, thereby saving network bandwidth and backup storage.

After journaling for a particular file occurs, the sum for that file is then reinitialized to zero, or perhaps just decremented by 100%. Continuing with the example, suppose a second write request is received in which the journal policy assigns a frequency of 75%. The sum is then incremented by 75% to reach 108%. Now the sum exceeds 100% so the second write request is journaled. If the journaling is performed with other prior write requests, the collection is journaled in a single journal message, and with a single time stamp. The sum is then reinitialized to zero, or perhaps decremented by 100% to 8%, and the process continues for each subsequent write request.

Regardless of how the decision is made, if it is determined that the write request should be journaled (Yes in decision block 203), it is then determined whether or not there are one or more prior write requests for that file that are yet to be journaled to the backup medium (decision block 204). If the method 200 is performed at the file level, decision block 204 may be skipped proceeding directly to the journaling process (act 206) since only the most recent file write request will be journaled. If there are other write requests to be journaled (Yes in decision block 204), the current write request is journaled along with the one or more prior write requests whose journaling was postponed due to the journal policy (act 205). For instance, if the write requests are at the sub-file block level (e.g., at the cluster level), then if one of the cluster write requests is to be journaled, all other non-redundant cluster write requests will be journaled within the same journal message. For instance, if there are three write requests to the same cluster, only the last write request to that cluster is journaled. If there are no such prior write requests (No in decision block 204), the current write request is journaled alone in the journal message provided to the backup medium (act 206).

On the other hand, if the policy indicates that the write request is not to be journaled (No in decision block 203), then the write request is cached (act 207) for future journaling until one or more further write requests are detected if the write request is at the sub-file block level. Otherwise, if the write request were at the file level, the write request may even be discarded.

FIGS. 3A through 3D show various stages of a backup process that illustrates an example of the principles of the present invention for illustrative purposes only. Each of FIGS. 3A through 3D illustrates a sub-file block write request being received by a journal decision module 302 that has access to a journaling policy 303 that contains decision parameters 304. An example of the decision parameters 304 may be, for example, a correlation between journal percentage and target file characteristics such as, for example, file type or other file metadata (such as file author or creator) and/or file content. Write requests that are not yet to be journaled, and that are not discarded, are provided into cache 305, while write requests that are to be presently journaled are provided to the backup medium 310 along with any existing write requests in the cache 305.

Figure 3A:
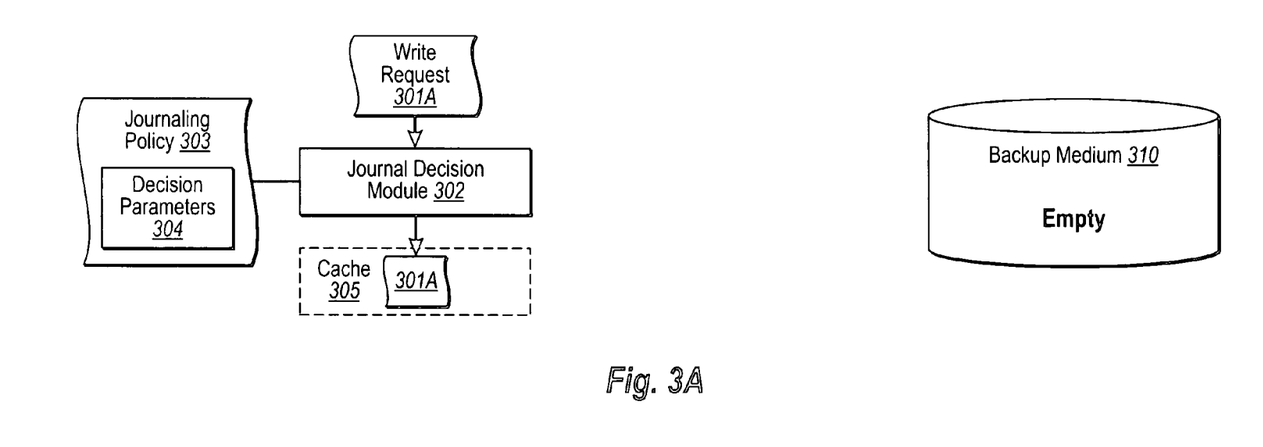
FIG. 3A illustrates a first stage of an example implementation of FIG. 2 in which write requests are selectively journaled or cached for future journaling based on the journaling policy.

For instance, FIG. 3A shows a first write request 301A being detected by the journal decision module 302. The journal decision module 302 may be hardware, software, or a combination of hardware and software. The journal decision module 302 accesses the journaling policy 303 and uses the decision parameters 304 to decide whether or not to presently journal the write request 301A. In this case, the decision module 302 decides that the write request journaling should be postponed. Accordingly, the write request 301A is placed in the cache 305. Although the backup medium 310 may already contain data in this example, that data is not germane to this particular example. Accordingly, the backup medium 310 is initially labeled as "Empty" in FIG. 3A since no write requests have yet been journaled in this particular example. If the write request had been at the file level, and there had been a decision not to journal the file write request, the write request may be simply discarded, rather than cached.

Figure 3B:
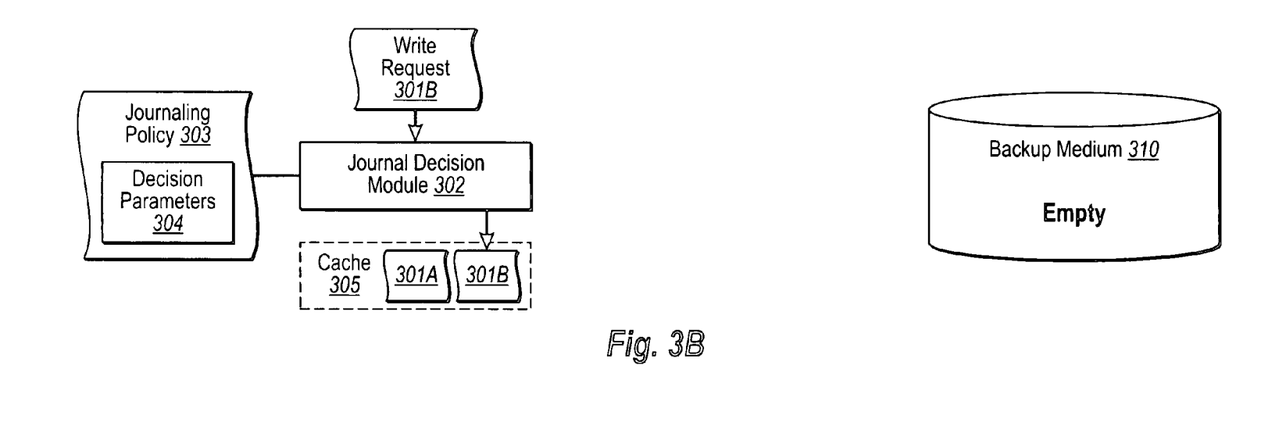
FIG. 3B illustrates a second stage of the example implementation of FIG. 3A.

In FIG. 3B, the journal decision module 302 then detects a second write request 301B. Once again, the journal decision module 302 decides not to yet journal the write request 301B, and so the write request 301B is provided into cache 305 (or discarded if the write request was at the file level).

Figure 3C:
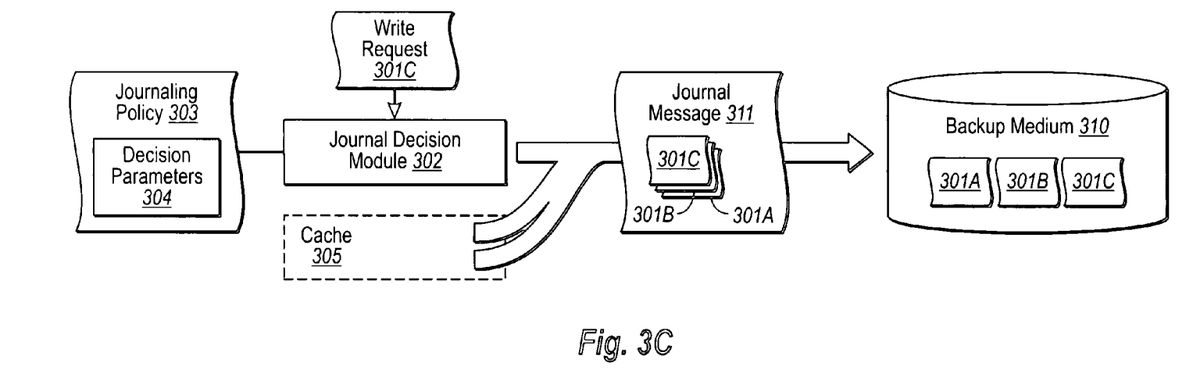
FIG. 3C illustrates a third stage of the example implementation of FIG. 3A.

In FIG. 3C, the journal decision module 302 detects a third write request 301C. Now, however, the journal decision module 302 decides to presently journal the third write request 301C. Accordingly, the third write request 301C, along with the first write request 301A and the second write request 301B are journaled to the backup medium 310 in a single journal message 311 with potentially a single time stamp. Alternatively or in addition, the various write requests may retain their own time stamps specifying the time that the write request was issued or detected. Note that in this example, the various write requests were at the sub-file block level. If there were cached sub-file block write requests that were redundant, those redundant write requests may be removed from the cache without being journaled to the backup medium. For instance, if write requests 301A and 301C were to the same sub-file block, and if write requests 301B and 301C were to different sub-file blocks, then only write requests 301B and 301C would be journaled. If the write requests 301A through 301C were file-level write requests, on the other hand, only the most current write request 301C would be journaled.

There are some write requests that may not be immediately journaled when the write request is first executed on the primary storage. In other cases, the file write request may never be journaled at all. Accordingly, it is possible that in the event the data in the primary storage is to be corrupted while there are still write requests pending for future journaling, that the recovery may not be completely up-to-date to the actual time of the corruption. However, the principles of the present invention allow policy setters (such as, for example, an Information Technology team at a corporation) to identify a more desirable balance between granularity of recovery versus expeditious use of storage and network resource given decision parameters such as write target file metadata and content when performing continuous data protection.

Figure 3D:
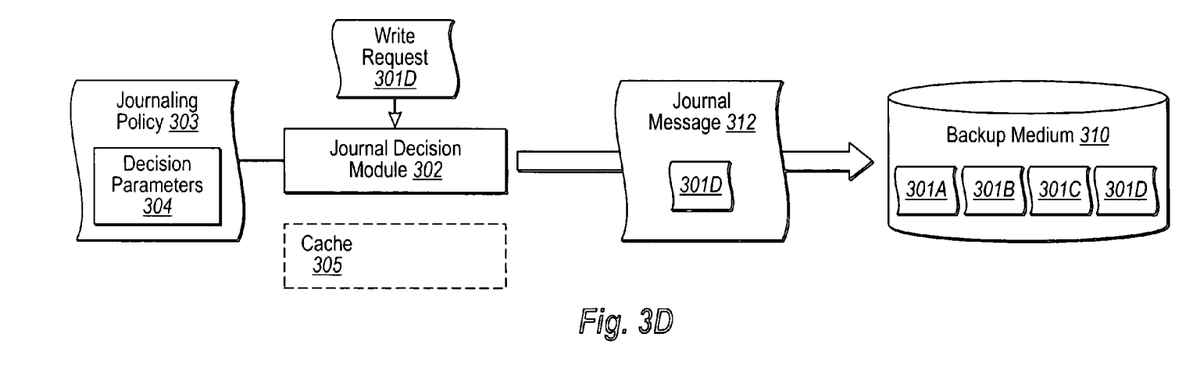
FIG. 3D illustrates a final stage of the example implementation of FIG. 3A.

Continuing with the example of FIGS. 3A through 3D, and now referring to FIG. 3D, the journal decision module 302 detects a fourth write request 301D, which is immediately journaled. For example, perhaps the write request was to a file designated as high priority, or was to a file that is of a high priority file type, or was to a file that contains certain key words indicative of a high priority file.

Figure 4:
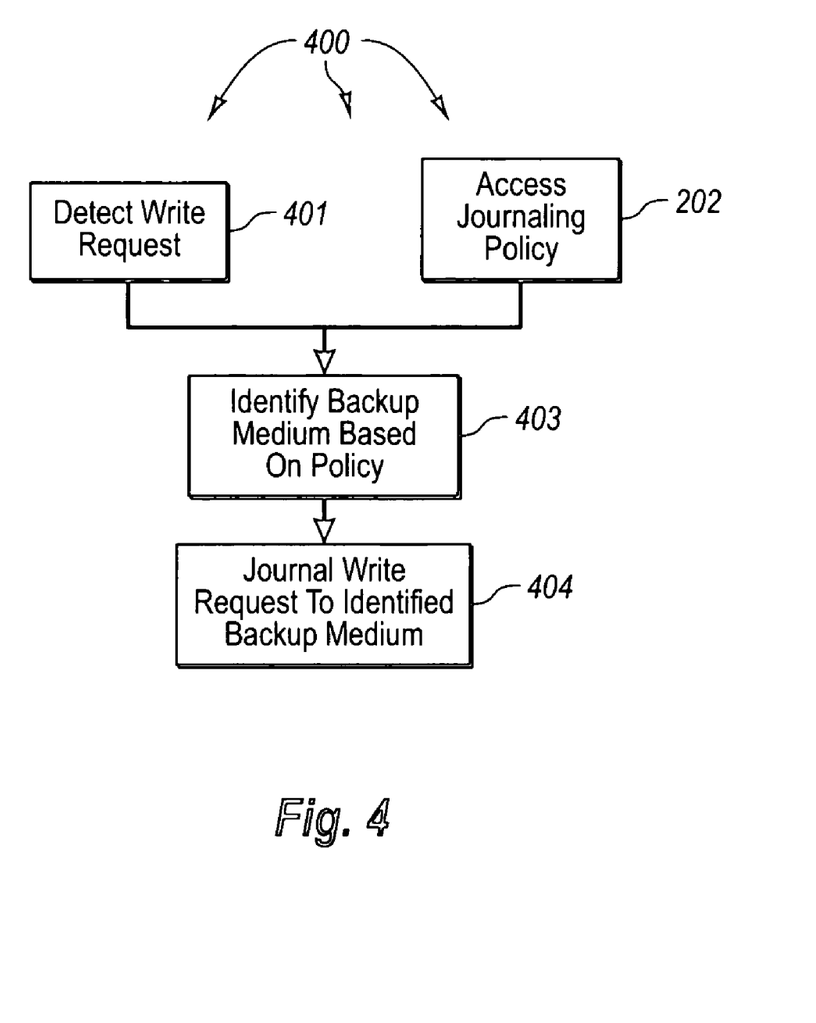
FIG. 4 illustrates a flowchart of a method for performing continuous data protection in which the backup medium is selected based on the journaling policy.

Accordingly, the principles of the present invention permit journaling frequency to be determined based on a journaling policy. The journaling policy cold be used to make other journaling decisions as well. For example, FIG. 4 illustrates a flowchart of a computer-implemented method 400 for performing continuous data protection on protected data also using journal policy. In this example, however, the journal decision is which of multiple backup mediums the write request should be journaled to. In this example, the write requests are file system level write requests.

Once again, the method 400 as illustrated may be initiated upon detecting a write request targeted to a target portion of the protected data (act 401). Also, the journaling policy is accessed (act 402). In this case, however, the decision parameters of the journaling policy may correlate the identity of the target backup medium based on the file type, other file metadata, and/or file content of the file being written to.

Figure 5A:
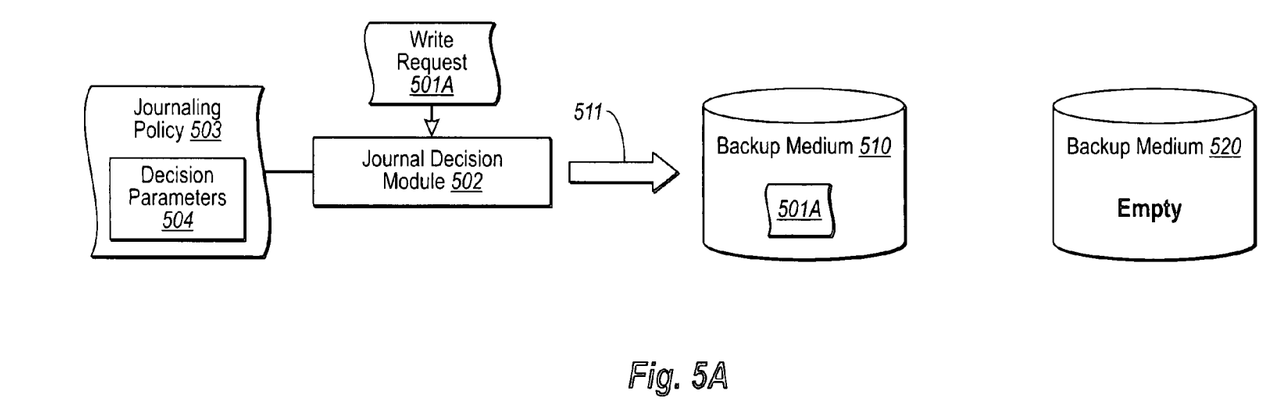
FIG. 5A illustrates a first stage of an example implementation of FIG. 4 in which write requests are journaled to specific backup mediums that are identified based on the journaling policy.
Figure 5B:
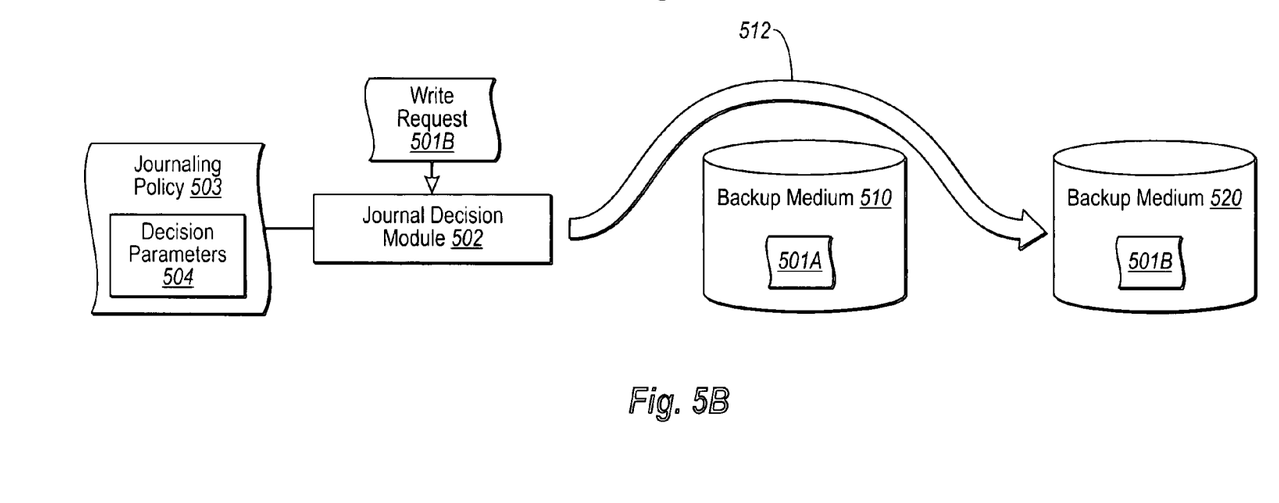
FIG. 5B illustrates a second stage of the example implementation of FIG. 5A.

The backup medium to be journaled to is identified (act 403) using the journaling policy and comparing the characteristics of the target file to the decision parameters in the journal policy. The file write request is then journaled to the identified backup medium (act 404). FIGS. 5A and 5B illustrate an example backup process showing an example implementation of the journaling method 400 of FIG. 4. Once again, in each of FIGS. 5A and 5B, a journal decision module 502 receives a write request, and then makes a decision based on the decision parameters 504 of the journaling policy 503 identifying one of multiple (in the illustrated case, two) backup mediums 510 and 520 to journal the write request to.

As an illustrative example, FIG. 5A shows first file write request 501A being detected by journal decision module 502. The journal decision module 502 decides to journal the first write request 501A to the first backup medium 510. Accordingly, the first write request 501A is journaled 511 to the first backup medium 510.

In FIG. 5B, a second write request 501B is detected by journal decision module 502. The journal decision module 502 decides to journal the second write request 501B to the second backup medium 520. Accordingly, the second write request 501B is journaled 512 to the second backup medium 520.

As previously described, FIGS. 3A through 3D illustrate a backup process in which journaling frequency is decided based on journaling policy. On the other hand, FIGS. 5A and 5B illustrate a backup process in which the backup medium is identified based on journaling policy. However, these backup processes are not mutually exclusive, but can be combined such that both the journaling frequency and backup medium are both identified based on the journaling policy. This combined backup process is illustrated by the example of FIGS. 6A through 6D. Once again, in each of FIGS. 6A through 6D, a journal decision module 602 receives a file write request, and then makes a decision regarding journaling frequency and backup medium based on the decision parameters 604 of the journaling policy 603. In each case, a cache 605 is also provided for storing write requests prior to being journaled.

Figure 6A:
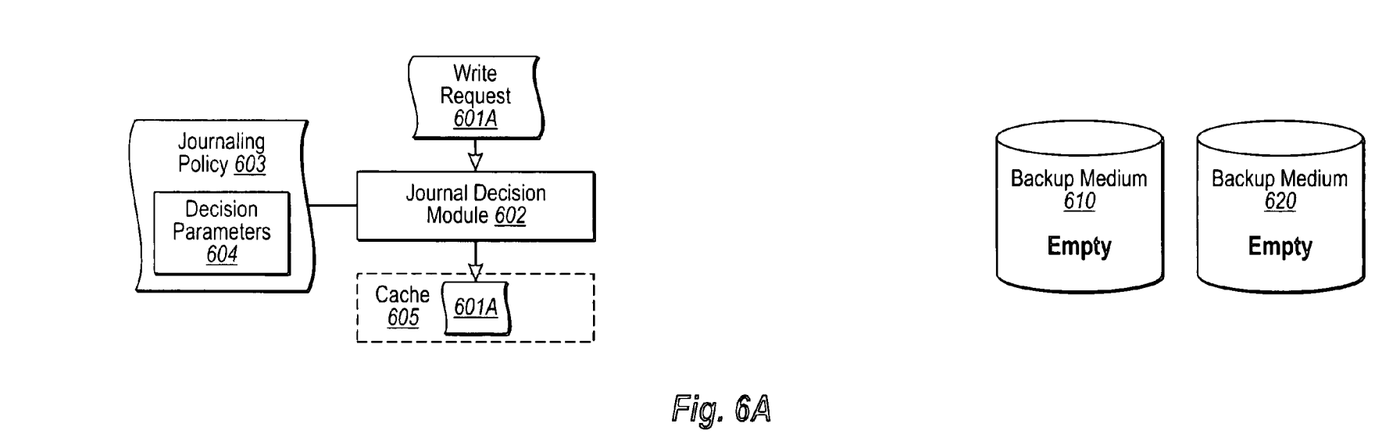
FIG. 6A illustrates a first stage of an example implementation of FIGS. 2 and 4 in which write requests are selectively journaled or cached for future journaling based on the journaling policy, and in which the identity of the backup medium is also selected based on the journaling policy.

Beginning with FIG. 6A, a first file write request 601A is provided to the journal decision module 602. The journal decision module 602 uses the journal policy 603 and its decision parameters 604 to decide that the first file write request 601A should not yet be journaled and/or that the first file write request 601A will never be journaled. If the first file write request 601A is never to be journaled, the first file write request 601A may simply be discarded. If there is a chance that the first file write request 601A might be journaled, then the first file write request 601A is provided to the cache 605 as shown in FIG. 6A.

Figure 6B:
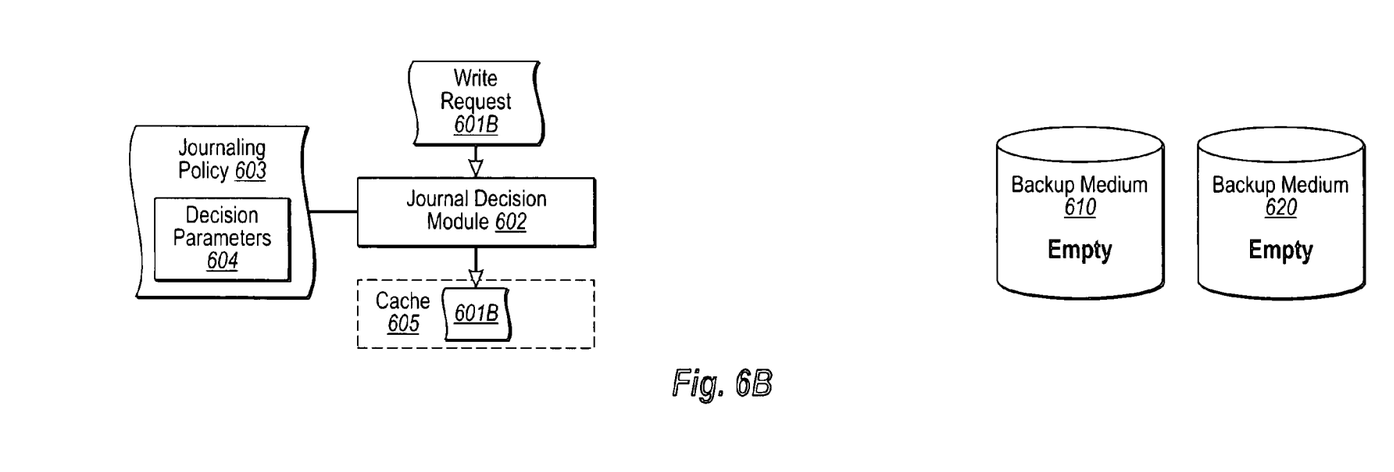
FIG. 6B illustrates a second stage of the example implementation of FIG. 6A.

In FIG. 6B, the second file write request 601B for a write to the same file is provided to journal decision module 602. The journal decision module 602 uses the decision policy 603 and its decision parameters 604 to decide that the second file write request 601B should not yet be journaled and/or that the first file write request 601B will never be journaled. If the second file write request 601B is never to be journaled, the second file write request may simply be discarded. If there is a chance the second file write request 601B might be journaled, then the second file write request 601B is provided to the cache 605 as illustrated in FIG. 6B. If the first file write request 601A had previously been provided to cache 605, then the first file write request 601A may be removed since it is rendered redundant by the second file write request 601B.

Figure 6C:
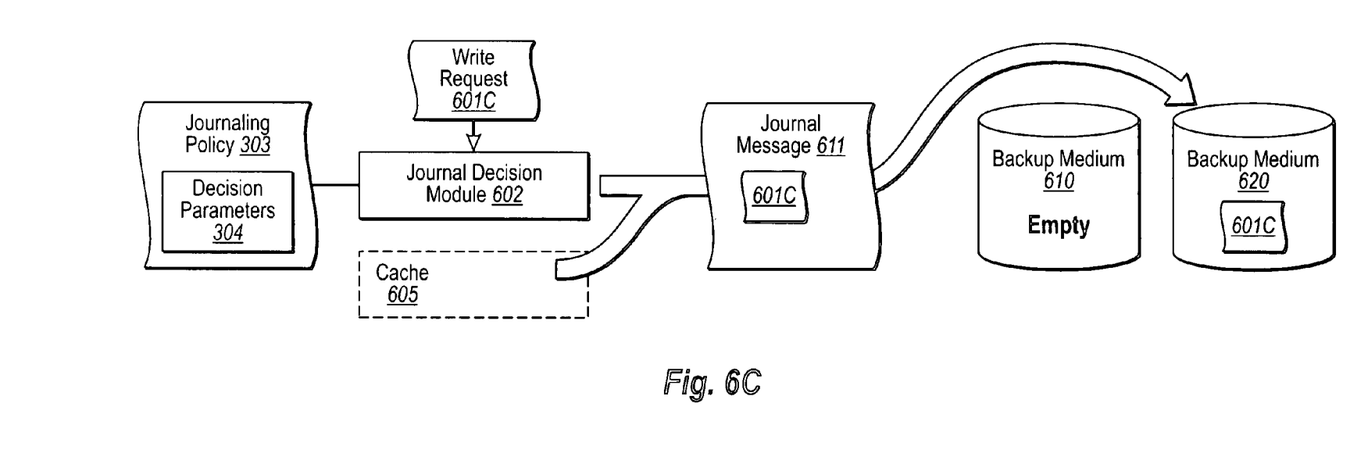
FIG. 6C illustrates a third stage of the example implementation of FIG. 6A.

In FIG. 6C, the third file write request 601C is provided to journal decision module 602. The journal decision module 602 uses the journaling policy 603 and its decision parameters 604 to decide that 1) the third file write request 601C should be journaled; and that 2) the third file write request 601C should be journaled to the second backup medium 620. Accordingly, the third write request 601C is journaled 611 to the backup medium 620.

Figure 6D:
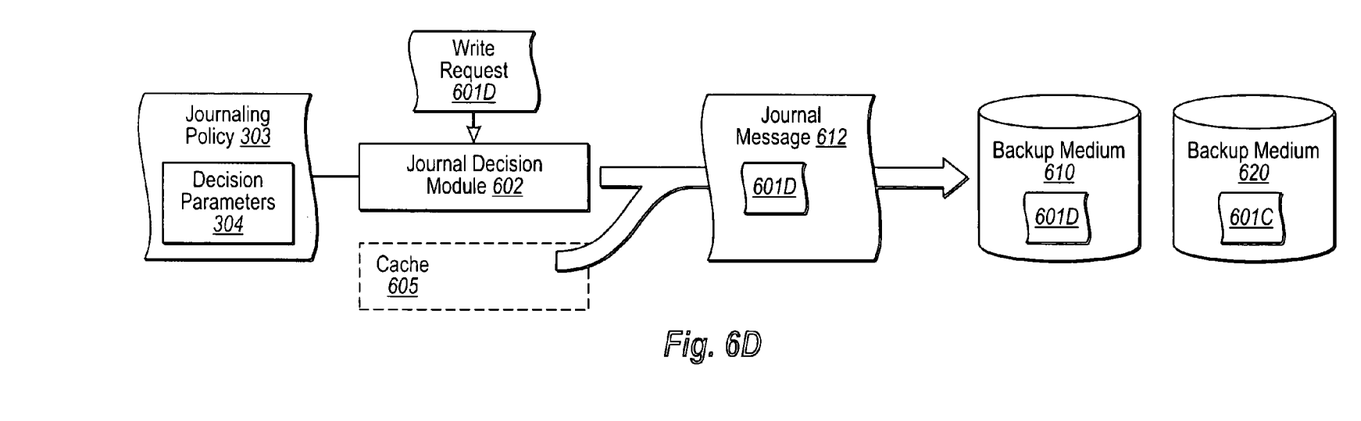
FIG. 6D illustrates a final stage of the example implementation of FIG. 6A.

FIG. 6D illustrates that a fourth file write request 601D is received by the journal decision module 602. The journal decision module 602 uses the journaling policy 603 and its decision parameters 604 to decide that 1) the fourth file write request 601D should be presently journaled; and that 2) the fourth file write request 601D should be journaled to the first backup medium 610. Accordingly, the fourth file write request 601D is journaled 612 to the first backup medium 610.

Accordingly, the principles of the present invention allow for policy-based journaling in automatically deciding how frequently and where to journal write requests when performing continuous data protection. This allows for the intelligent setting of journaling policy so as to balance backup granularity with efficient usage of storage and network bandwidth when performing continuous data protection.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. A computer-implemented method for performing continuous data protection on protected data, the method comprising:
   identifying a write request targeted to a target portion of the protected data; wherein the target portion of the protected data comprises at least a portion of a file;
   accessing a journaling policy data structure, the journaling policy data structure comprising criteria used to determine, based on one or more keywords within content of the target portion of the protected data, whether to journal the write request to a backup medium;
   identifying one or more keywords within the content of the target portion of the protected data; and
   applying the criteria of the journaling policy data structure to determine, based on the one or more keywords within the content of the target portion of the protected data, whether to journal the write request to the backup medium;
   wherein at least a portion of the method is performed by a computing system comprising at least one processor.

2. The computer-implemented method in accordance with claim 1, wherein the target portion of the protected data comprises a file block.

3. The computer-implemented method in accordance with claim 1, wherein the target portion of the protected data comprises one or more sub-file blocks.

4. The computer-implemented method in accordance with claim 1, wherein:
   the one or more keywords within the content of the target portion identify a file type of the file.

5. The computer-implemented method in accordance with claim 1, wherein applying the criteria of the journaling policy to determine whether the journal the write request comprises:
   determining to journal the write request; and
   journaling the write request to the backup medium.

6. The computer-implemented method in accordance with claim 1, wherein applying the criteria of the journaling policy data structure to determine whether to journal the write request to the backup medium comprises:
   determining whether to journal the write request;
   identifying one or more prior write requests that have not been journaled due to application of the criteria of the journaling policy data structure;
   simultaneously journaling the write request and the one or more prior write requests to the backup medium.

7. The computer-implemented method in accordance with claim 1, wherein the write request is a first write request, and applying the criteria of the journaling policy data structure to determine whether to journal the write request to the backup medium comprises:
   determining that journaling of the first write request should be delayed at least until one or more additional write requests are identified;
   identifying, after determining that journaling of the first write request should be delayed, one or more additional write requests; and
   simultaneously journaling the first write and the one or more additional write requests.

8. The computer-implemented method in accordance with claim 1, wherein the journaling policy data structure further comprises criteria used to identify, based on the one or more keywords within the content of the target portion of the protected data, a target backup medium for the write request, the method further comprising:
   applying the criteria of the journaling policy data structure to identify, based on the one or more keywords within the content of the target portion of the protected data, the target backup medium for the write request.

9. The computer-implemented method in accordance with claim 1, wherein the keywords within the content of the target portion of the protected data identify at least one of:
   at least one word within the file;
   the number of instances of a word within the file;
   an author of the file;
   a file type of the file.

10. A computer program product comprising one or more computer-readable storage media having thereon computer-executable instructions that, when executed by one or more processors of a computing system, cause the computing system to perform a method for performing continuous data protection on protected data, the method comprising:
    identifying a write request targeted to a target portion of the protected data; wherein the target portion of the protected data comprises at least a portion of a file;
    identifying one or more keywords within content of the target portion of the protected data;
    accessing a journaling policy data structure, the journaling policy data structure comprising criteria used to determine, based on the one or more keywords within the content of the target portion of the protected data, whether to journal the write request to a backup medium; and
    applying the criteria of the journaling policy data structure to determine, based on the one or more keywords within the content of the target portion of the protected data, whether to journal the write request to the backup medium.

11. The computer program product in accordance with claim 10, wherein the one or more computer-readable storage media comprises at least one of physical memory and storage media.

12. A computer-implemented method for performing continuous data protection on protected data, the method comprising:
    identifying a write request targeted to a target portion of the protected data; wherein the target portion of the protected data comprises at least a portion of a file;
    accessing a journaling policy data structure, the journaling policy data structure comprising criteria used to identify, based on one or more keywords within content of the target portion of the protected data, a target backup medium for the write request; and applying the criteria of the journaling policy data structure to identify, based on the one or more keywords within the content of the target portion of the protected data, the target backup medium for the write request;

wherein at least a portion of the method is performed by a computing system comprising at least one processor.

13. The computer-implemented method in accordance with claim 12, wherein the target portion of the protected data comprises a file block.

14. The computer-implemented method in accordance with claim 12, further comprising identifying, based on the one or more keywords within the content of the target portion, a file type of a file.

15. The computer-implemented method in accordance with claim 12, wherein the write request is a first write request, and the backup medium is a first backup medium, the method further comprising:

journaling the first write request to the first backup medium;

identifying, after identifying the first write request, a second write request targeted to the target portion of the protected data;

applying the criteria of the journaling policy data structure to identify, based on the one or more keywords within the content of the target portion of the protected data, a second target backup medium for the second write request; and journaling the second write request to the second backup medium.

16. The computer-implemented method in accordance with claim 12, wherein the keywords within the content of the target portion of the protected data identify at least one of:

at least one word within the file;
the number of instances of a word within the file;
an author of the file;
a file type of the file.

17. A computer program product comprising one or more computer-readable storage media having thereon computer-executable instructions that, when executed by one or more processors of a computing system, cause the computing system to perform a method for performing continuous data protection on protected data, the method comprising:

identifying a write request targeted to a target portion of the protected data; wherein the target portion of the protected data comprises at least a portion of a file;

accessing a journaling policy data structure, the journaling policy data structure comprising criteria used to identify, based on one or more keywords within content of the target portion of the protected data, a target backup medium for the write request; and applying the criteria of the journaling policy data structure to identify, based on the one or more keywords within the content of the target portion of the protected data, the target backup medium for the write request.

18. The computer program product in accordance with claim 17, wherein the one or more computer-readable storage media comprise at least one of physical memory and storage media.

19. The computer program product in accordance with claim 17, wherein the write request is a first write request, and the backup medium is a first backup medium, the method further comprising:

journaling the first write request to the first backup medium;

identifying, after identifying the first write request, a second write request targeted to the target portion of the protected data;

applying the criteria of the journaling policy data structure to identify, based on the one or more keywords within the content of the target portion of the protected data, a second target backup medium for the second write request; and journaling the second write request to the second backup medium.

\* \* \* \* \*